United States Patent
Berkovitz et al.

(10) Patent No.: US 11,233,867 B2
(45) Date of Patent: Jan. 25, 2022

(54) ON-DEMAND PUSH NOTIFICATION MECHANISM

(71) Applicant: Microsoft Technology Licensing, LLC., Redmond, WA (US)

(72) Inventors: Avihai Berkovitz, Tel-Aviv (IL); Vitaly Khait, Yavne (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 376 days.

(21) Appl. No.: 15/456,919

(22) Filed: Mar. 13, 2017

(65) Prior Publication Data

US 2018/0262587 A1 Sep. 13, 2018

(51) Int. Cl.
*H04L 29/08* (2006.01)
*H04L 29/06* (2006.01)

(52) U.S. Cl.
CPC .............. *H04L 67/26* (2013.01); *H04L 67/02* (2013.01); *H04L 67/2804* (2013.01); *H04L 63/0428* (2013.01); *H04L 63/164* (2013.01)

(58) Field of Classification Search
CPC ..... H04L 67/12; H04L 65/1069; H04L 67/26; H04L 67/02; H04L 67/2804; H04L 63/0428; H04L 63/16; H04L 63/164
See application file for complete search history.

(56) References Cited

U.S. PATENT DOCUMENTS

| | | | | |
|---|---|---|---|---|
| 6,240,453 B1* | 5/2001 | Chang | ................. | G06F 11/3495 709/226 |
| 6,311,206 B1* | 10/2001 | Malkin | ................. | H04L 29/06 707/999.01 |
| 6,591,279 B1* | 7/2003 | Emens | ................. | G06Q 30/02 |
| 7,761,522 B2 | 7/2010 | Shenfield et al. | | |

(Continued)

FOREIGN PATENT DOCUMENTS

WO      2015021873 A1      2/2015

OTHER PUBLICATIONS

Krishnan, Vivin, "Configure Push notifications proxy for MobileFirst Server", https://mobilefirstplatform.ibmcloud.com/blog/2015/09/10/configure-push-notification-proxy/, Published on: Sep. 10, 2015, 3 pages.

(Continued)

*Primary Examiner* — Kevin T Bates
*Assistant Examiner* — Ranjan Pant
(74) *Attorney, Agent, or Firm* — M&B IP Analysts, LLC

(57) ABSTRACT

A method, a non-transitory computer readable medium, and a proxy device. The method includes receiving, by a proxy device, a request to access a first web resource of a plurality of web resources; modifying a received response to include at least a messaging handler, wherein the response corresponds to the received request; returning the modified response with the messaging handler to a client device, wherein the messaging handler causes establishment of a communication channel between the client device and a (Continued)

notification server; and providing the notification server with at least one notification, wherein the notification server immediately pushes the at least one notification to the client device over the communication channel, wherein the at least one notification is related to at least the first web resource.

18 Claims, 7 Drawing Sheets

(56) References Cited

U.S. PATENT DOCUMENTS

| | | | |
|---|---|---|---|
| 8,713,099 B2 | 4/2014 | Sana et al. | |
| 8,739,249 B1 | 5/2014 | Kay et al. | |
| 9,331,967 B2 | 5/2016 | Gangadharan et al. | |
| 9,342,333 B2 | 5/2016 | Charles | |
| 9,384,101 B2 | 7/2016 | Calvo et al. | |
| 9,503,452 B1* | 11/2016 | Kumar | H04L 67/306 |
| 2004/0015537 A1* | 1/2004 | Doerksen | H04L 29/06 |
| | | | 709/203 |
| 2008/0319839 A1* | 12/2008 | Olliphant | G06Q 30/02 |
| | | | 705/14.54 |
| 2012/0136926 A1* | 5/2012 | Dillon | G06F 16/9574 |
| | | | 709/203 |
| 2013/0111003 A1* | 5/2013 | Burckart | H04L 67/26 |
| | | | 709/223 |
| 2013/0144974 A1 | 6/2013 | Haakenson et al. | |
| 2013/0246504 A1* | 9/2013 | Hu | H04L 67/26 |
| | | | 709/203 |
| 2014/0337405 A1* | 11/2014 | Athas | H04L 67/26 |
| | | | 709/203 |
| 2014/0365523 A1* | 12/2014 | Wagner | G06F 16/435 |
| | | | 707/770 |
| 2015/0089579 A1* | 3/2015 | Manza | H04L 63/0838 |
| | | | 726/1 |
| 2016/0028677 A1* | 1/2016 | Narasimhan | H04L 51/22 |
| | | | 709/203 |
| 2016/0142375 A1* | 5/2016 | Tubi | H04L 63/0281 |
| | | | 726/1 |
| 2016/0261472 A1* | 9/2016 | Tubi | H04L 43/065 |
| 2018/0152358 A1* | 5/2018 | Chheda | H04L 41/5009 |

OTHER PUBLICATIONS

"Amazon Simple Notification Service (SNS)", https://aws.amazon.com/sns/?sc_channel=PS&sc_campaign=acquisition_IN&sc_publisher=google&sc_medium=sns_nb&sc_content=push_notification_p&sc_detail=push%20notification%20service&sc_category=sns&sc_segment=717602098218&sc_matchtype=p&sc_country=IN&s_kwcid=AL!4422!3!171760209821!p!!g!!push%20notification%20service&ef_id=WEGrUwAAAH-zwH94:20170124235005:s, Retrieved on: Jan. 24, 2017.

Willett, et al., "Is there a list of 3rd party push providers that work with this plugin?", https://github.com/phonegap/phonegap-plugin-push/issues/344, Published on: Nov. 17, 2015, 1 pages.

* cited by examiner

ON-DEMAND PUSH NOTIFICATION MECHANISM

BACKGROUND

Push notification (also known as "server-push") is a mechanism for delivery of information initiated by the server. The notification (information) pushed from a server to a client device is typically received as a response to a request from the client device. Some push mechanisms require an installation of a client program, such as a plug-in or add-on. Such a program periodically initiates requests for information from the server.

Some push mechanisms send messages that pop up on a client device on a schedule or upon occurrence of an event determined by the server rather than upon request from the client. For example, mobile applications (apps) allow for receiving notifications pushed by an application server at any time. That is, users do not need to be currently using the application or their devices to receive such notifications. In this mode of operation, users have to register (or enable) their devices to receive notifications. Typically, notifications are pushed over HTTP protocols to a registered client device.

Current push notification mechanisms operate in a model where a server can push notifications related only to an application or website that the server serves. For example, a server cannot push notifications related to both Facebook® and LinkedIn®, as these are different websites hosted on different servers. This is a limiting factor, in particular in deployments where the notification should be pushed on-demand by a third-party device (i.e., by neither the client nor the server).

One such deployment is when the traffic between the client and servers is monitored and regulated by a proxy device. In many cases, the proxy device is required to report actions or status of their requests to the client devices. For example, when a client device cannot access a particular website. The reporting should be by means of notification being pushed to the client devices on-demand of the proxy device. However, current mechanisms do not allow receiving of push notifications by or under the control of a third-party device (e.g., a proxy device communicatively connected between the user device and the server).

In addition, as some of the existing push mechanisms require the user to register to a notification service and/or install a dedicated agent on the client device, such mechanisms are not transparent or seamless to users of the client devices. This is another limiting factor, as some mechanisms are not applicable for cloud computing services that require transparent and seamless operation. For example, providers of cloud applications would like to ensure uninterrupted services from any browser and after any software update of either the browser or the cloud application.

It would therefore be advantageous to provide a solution that would overcome the deficiencies noted above.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method. The method comprises: receiving, by a proxy device, a request to access a first web resource of a plurality of web resources; modifying a received response to include at least a messaging handler, wherein the response corresponds to the received request; returning the modified response with the messaging handler to a client device, wherein the messaging handler causes establishment of a communication channel between the client device and a notification server; and providing the notification server with at least one notification, wherein the notification server immediately pushes the at least one notification to the client device over the communication channel, wherein the at least one notification is related to at least the first web resource.

Some embodiments disclosed herein include a non-transitory computer readable medium having stored thereon instructions for causing a processing circuitry to execute a process for on-demand push notification, the process comprising: receiving, by a proxy device, a request to access a first web resource of a plurality of web resources; modifying a received response to include at least a messaging handler, wherein the response corresponds to the received request; returning the modified response with the messaging handler to a client device, wherein the messaging handler causes establishment of a communication channel between the client device and a notification server; and providing the notification server with at least one notification, wherein the notification server immediately pushes the at least one notification to the client device over the communication channel, wherein the at least one notification is related to at least the first web resource.

Some embodiments disclosed herein include a proxy device, the proxy device comprises: a processing circuitry; and a memory, the memory containing instructions that, when executed by the processing circuitry, configure the proxy device to: receive, by a proxy device, a request to access a first web resource of a plurality of web resources; modify a received response to include at least a messaging handler, wherein the response corresponds to the received request; return the modified response with the messaging handler to a client device, wherein the messaging handler causes establishment of a communication channel between the client device and a notification server; and provide the notification server with at least one notification, wherein the notification server immediately pushes the at least one notification to the client device over the communication channel, wherein the at least one notification is related to at least the first web resource.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
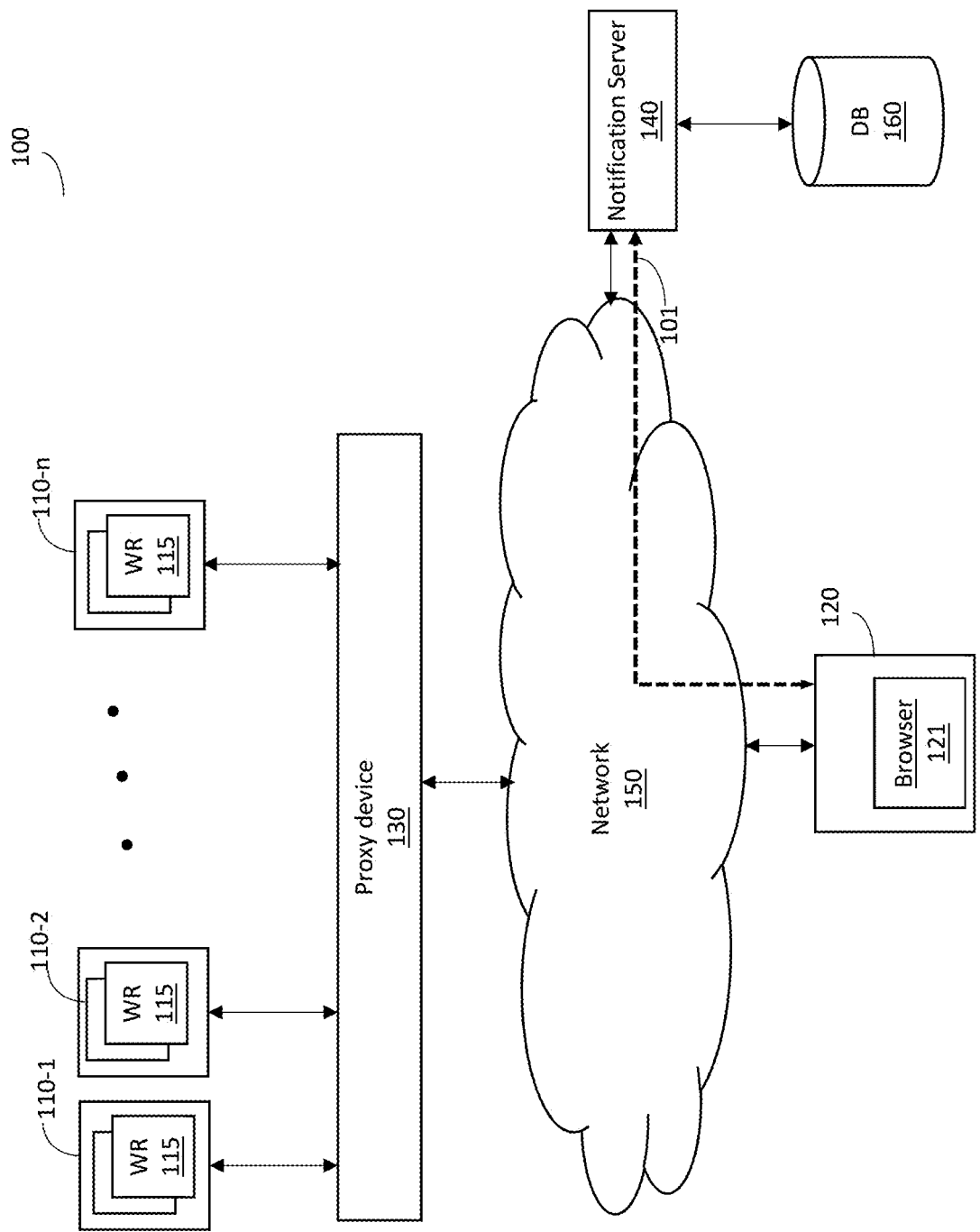
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, a proxy device is configured to push real-time notifications across different web resources to a browser of a client device. The implementation of the push notification mechanism is performed without modifying the web resources or the browser. In an embodiment, a secured channel is established between the client device's browser and a notification server operates under the control of the proxy device. Notifications are pushed, on-demand and in real-time, to the browser over the secured channel. The notifications may be displayed as pop-up messages on the browser.

FIG. 1 is an example diagram of a networked system 100 utilized to describe the various disclosed embodiments. The networked system 100 includes a plurality of servers 110-1 through 110-n (collectively referred to hereinafter as servers 110 and individually as a server 110, merely for simplicity purposes), each of which is configured to execute or otherwise host one or more web resources (collectively shown as WRs 115). The servers can be hosted in computing platforms including, but not limited to, a private cloud, a public cloud, a hybrid cloud, a datacenter, on-premises, or any other platform providing computing resources.

A server 110 may be an application server, a web server, and the like, and can be realized as a virtual machine or a physical machine. A web resource 115 may include, but is not limited to, a website, a web service, a web application, a cloud application, and so on. Examples for web resources 115 may include an e-commerce application, a collaboration application, an office and messaging application, a social media application, an enterprise application, a gaming application, a media sharing application, and the like.

It should be emphasized that different servers 110 or even the same server may be configured to execute different cloud applications. For example, the server 110-1 may host Office® 365 web services, while the server 110-2 would host the website salesforce.com web services. The disclosed embodiments allow pushing of notifications related to multiple different web resources 115 by a third-party device.

The networked system 100 further includes a client device 120 configured to access the web resources 115 using, for example, a browser 121. The browser 121 may include any software application (app) installed on a client device 120 that is configured to access web resources. The browser 121 may include, for example, the Internet Explorer®, Safari®, Edge®, Chrome®, Firefox®, and the like. The client device 120 may include, for example, a personal computer, a laptop, a tablet computer, a smartphone, a wearable computing device, or any other computing device.

According to the disclosed embodiments, the networked system 100 also includes a proxy device 130 and a notification server 140 communicatively connected to the computing platform 110 and the client device 120 through a network 150. The network 150 may be, for example, a wide area network (WAN), a local area network (LAN), the Internet, and the like.

The proxy device 130 is configured to proxy all traffic between the servers 110 and the client device 120. The proxy device 130 may include, for example, a suffix proxy, a forward proxy, a managed proxy, and the like. In any configuration, the proxy device 130 is configured to intercept or requests received from the client device 120 and to modify responses from the servers 110.

In an example embodiment, the proxy device 130, operating as a managed proxy, is further configured to monitor and regulate access, by the client device 120, to the web resources 115. In such an embodiment, the proxy device 130 is configured to detect and mitigate network threats against the web resources 115. The detection and mitigation activities may include, for example, alerting on suspicious network traffic and behavior; blocking threats; performing application control, URL filtering, and malware protection on the network traffic; establishing visibility to application layer parameters (e.g., a list of users, devices, locations, etc.); generating profiles of users using the web resources 115; providing alerts on specific or predefined events; generating audit logs; and so on. The client device 120 is notified on certain actions performed by the proxy device 130.

According to the disclosed embodiments, the proxy device 130 is configured to detect a request to access a web resource 115 and the corresponding response generated by a server 110. The proxy device 130 is further configured to modify the response to include a messaging handler (not shown). In an embodiment, the messaging handler is a script code, such as, but not limited to, JavaScript. In some embodiments, the messaging handler may be embedded in an iFrame HTML tags (<iFrame>; </iFrame>), in a CSS file, and the like.

The messaging handler, once downloaded and processed by the browser 121, is configured to establish a communication channel 101 with the notification server 140. In one embodiment, the communication channel 101 is a secured channel. The notification server 140 is configured to push notifications on-demand and in real-time over the secured channel 101. In an example embodiment, the secured channel 101 is realized using a WebSocket protocol. A WebSocket Protocol is an independent TCP-based protocol designed to facilitate real-time data transfer from and to a server (e.g., the notification server 140). Using a WebSocket protocol, the notification server can communicate with the browser 121 over the secured channel 101 through encrypted ports (e.g., a TLS-encrypted port). In an embodiment, the notification server 140 executes a web application (not shown) to enable communication using the WebSocket protocol.

It should be noted that other protocols can be used for communication between the browser 121 and the notification server 140, and that the disclosed embodiments are not limited to a WebSocket implementation.

In an embodiment, the notification server 140 operates under the control of the proxy device 130. Specifically, the proxy device 130 is configured to provide the notification server 140 with the information required to generate and push a notification immediately after an action (e.g., a mitigation action) is taken by the proxy device 130. Thus, the notification server 140 pushes a notification to the browser on-demand of the proxy device 130.

In one example embodiment, the events that would trigger sending notification data to the notification server 140, and thereby to push such notifications to the browser 121, are predefined in a notification policy maintained by the proxy device. The notification policy may be defined per web resource, per user, or both, and indicates the types of notifications to push and when to push such notifications.

In an embodiment, the proxy device 130 is configured to provide the notification server 140 with at least a message code and an identifier of the client device 120. Additional information provided to the notification server 140 may include a name of the web resource, a specific resource attempted to be accessed, a language in which to display the notification, and so on. Using the message code (and preferably the additional information), the notification server 140 is configured to compile the notification to be pushed to the browser 121 over the secured channel 101. In an embodiment, using the message code, the notification server 140 can retrieve a template of the notification from a database 160 communicatively connected to the notification server 140. The database 160 can be pre-configured with such templates. Further, templates can be added or updated as more web resources are monitored by the proxy device 130.

In some embodiments, the template is retrieved by the proxy device 130 and provided to the notification server 140. The template may be, for example, an HTML file, an XML file, a text file, and the like.

A notification compiled by the server 140 may be indicative about any action restricted by the managed proxy server 130. For example, a download of a file, sharing of a file, collaborating on a file, uploading a file, exporting a file, running a specific report, accessing certain functions of the application, and so on. A notification compiled by the notification server 140 may be indicative about a status of the web resource 115 being accessed (e.g., that the resource is not available). Other notifications may be related to services offered by the web resources, such as promotions, live updates, warnings, weather updates, and so on.

The unique identifier included in the notification data may recognize the messaging handler executed by the browser 121. Such an identifier may be generated as a combination of a user identifier (user name), the browser's type, a client device's identifier. In another embodiment, the unique identifier may be a random number generated and assigned to the messaging handler. The notification server 140 is configured to push the notifications to the correct destination browser 121 over the channel 101.

In one embodiment, the communication between the notification server 140 and the proxy device 130 may be performed using a predefined application program interface (API). The connection between the proxy device 130 and the notification server 140 can be established over, for example, a VPN.

In an embodiment, the notifications pushed to the browser 120 over the secured channel 101 are formatted as pop-up messages specifying the information to be reported by the proxy device 130. To this end, the notification server 140 is configured to generate a piece of code that, when processed by the messaging handler, causes the browser 121 to display the pop-up window. The piece of code may include, for example, HTML, JavaScript, and the like.

Figure 2:
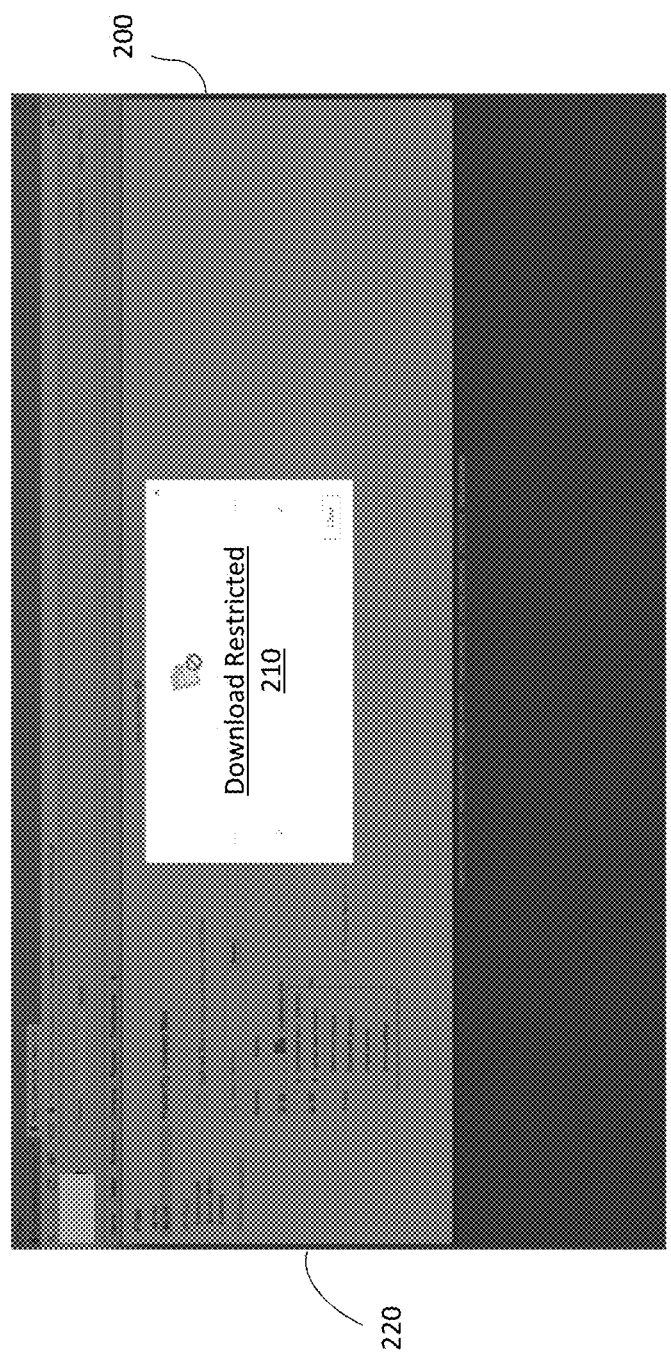
FIG. 2 is an example pop-up message notification displayed according to an embodiment.

An example pop-up message 200 is demonstrated in FIG. 2. The pop-up message 200 indicates "downloaded restricted". i.e., that a download attempt of the user is blocked. The message 210 further displays the reason for blocking the access and the specific file name that the user attempted to download. The message 210 is displayed over a webpage 220 accessed by the browser. In some embodiments, the notification may be in a format of a text message, an email, an instant message, and the like, and thus should be viewed as limited to a pop-up message.

Returning to FIG. 1, the proxy device 130 and the notification server 140 provide a centralized mechanism to push notifications across a plurality of different web resources 115, and in particular, web resources 115 monitored by the proxy device 130. Specifically, once the messaging handler embedded in the response returns to the client device 120 and the secured channel 101 is established with the notification server 140, the proxy device 130 can determine what notifications to push and when regardless of whether the web resource 115 is being currently accessed by the browser 121. Further, the messaging handler is agnostic to the web browser 115 being accessed, as the handler merely provides a direct communication means with the notification server 140. A different messaging handler will be included in each different response (or webpage) being processed by the web browser 121.

Figure 3A:
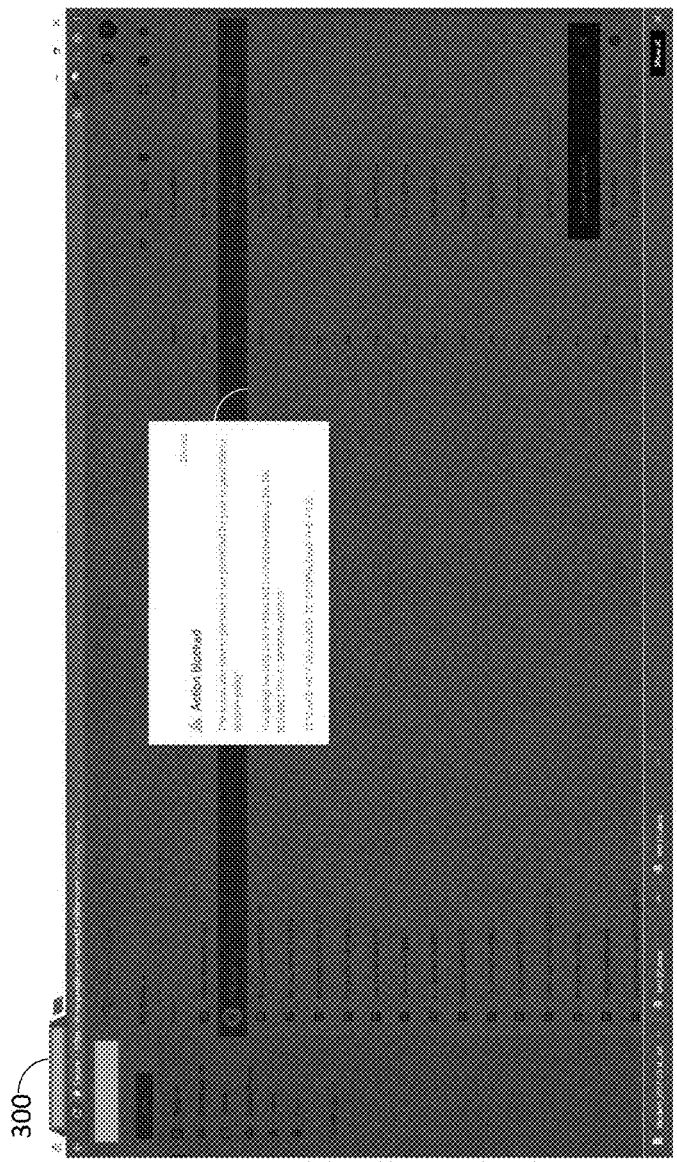
FIGS. 3A and 3B are example pop-up message notifications pushed for two different web resources according to an embodiment.
Figure 3B:
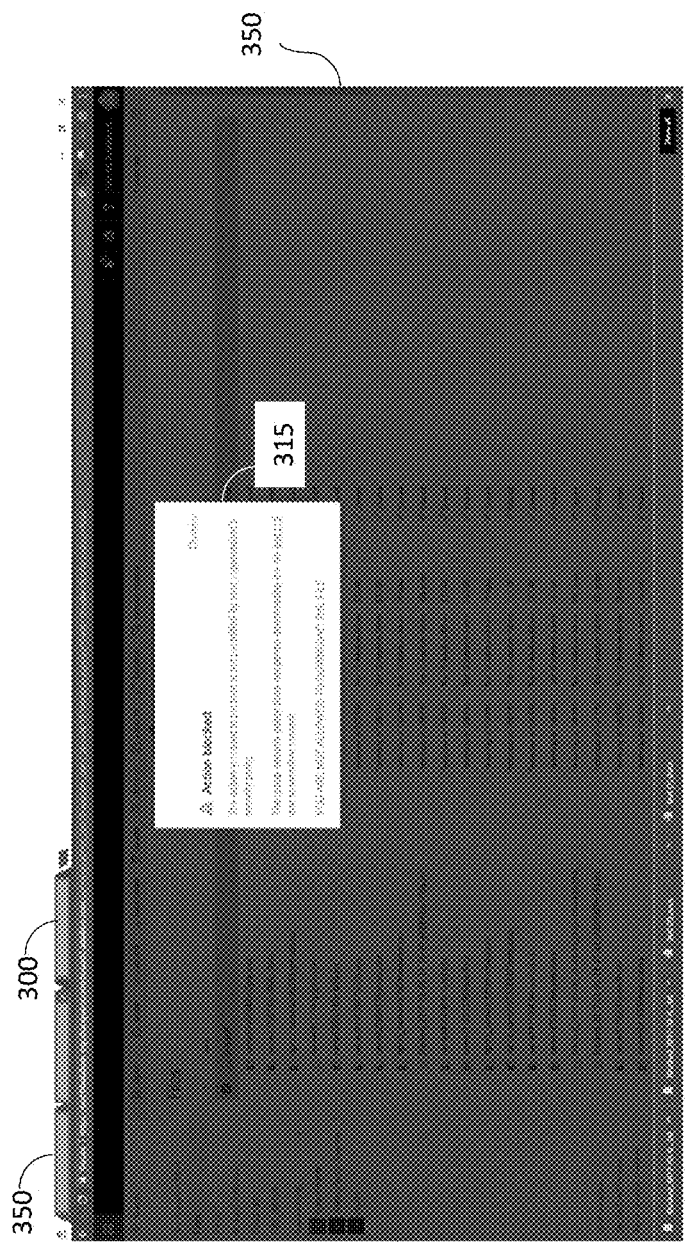

For example, FIGS. 3A and 3B, respectively, show example screenshots 300 and 350 of two different browser's tabs of the same browsing session. Each of the screenshots 300 and 350 includes a notification 310 and 315, respectively, indicating "action blocked", i.e., a user's attempt to download a file is blocked. The notification is generated when the user requested action does not comply with the security application being accessed. In the screenshot 300, the notification 310 may be pushed for, e.g., the Google® Drive service, while for the screenshot 350 the notification 315 may be pushed for, e.g., the Office® 365™ service.

It should be noted that the embodiments disclosed herein are not limited to the specific architecture illustrated in FIG. 1, and that other architectures may be equally used without departing from the scope of the disclosed embodiments. Specifically, in an embodiment, there may be a plurality of cloud computing platforms, a plurality of data centers, or both, managed by the same of different service providers. In addition, the managed proxy device 130 and the notification server are configured to manage a plurality of client devices and not just a single client device as illustrated in FIG. 1.

Furthermore, without departing from the scope of the disclosed embodiments, there may be a plurality of plurality proxy devices 130 or a plurality of notification servers 140 operating as described hereinabove and configured to either have one as a standby gateway to take control in a case of failure, to share the load between them, or to split the functions between them. In certain implementations, the functionally of the notification server 140 can be integrated in the proxy device 130.

Each of the proxy device 130 and the notification 140 server may include a processing circuity coupled to a memory (not shown in FIG. 2). The processing circuity may be realized by one or more hardware logic components and circuits. A detailed discussion for implementing a proxy device 130 is provided below.

Figure 4:
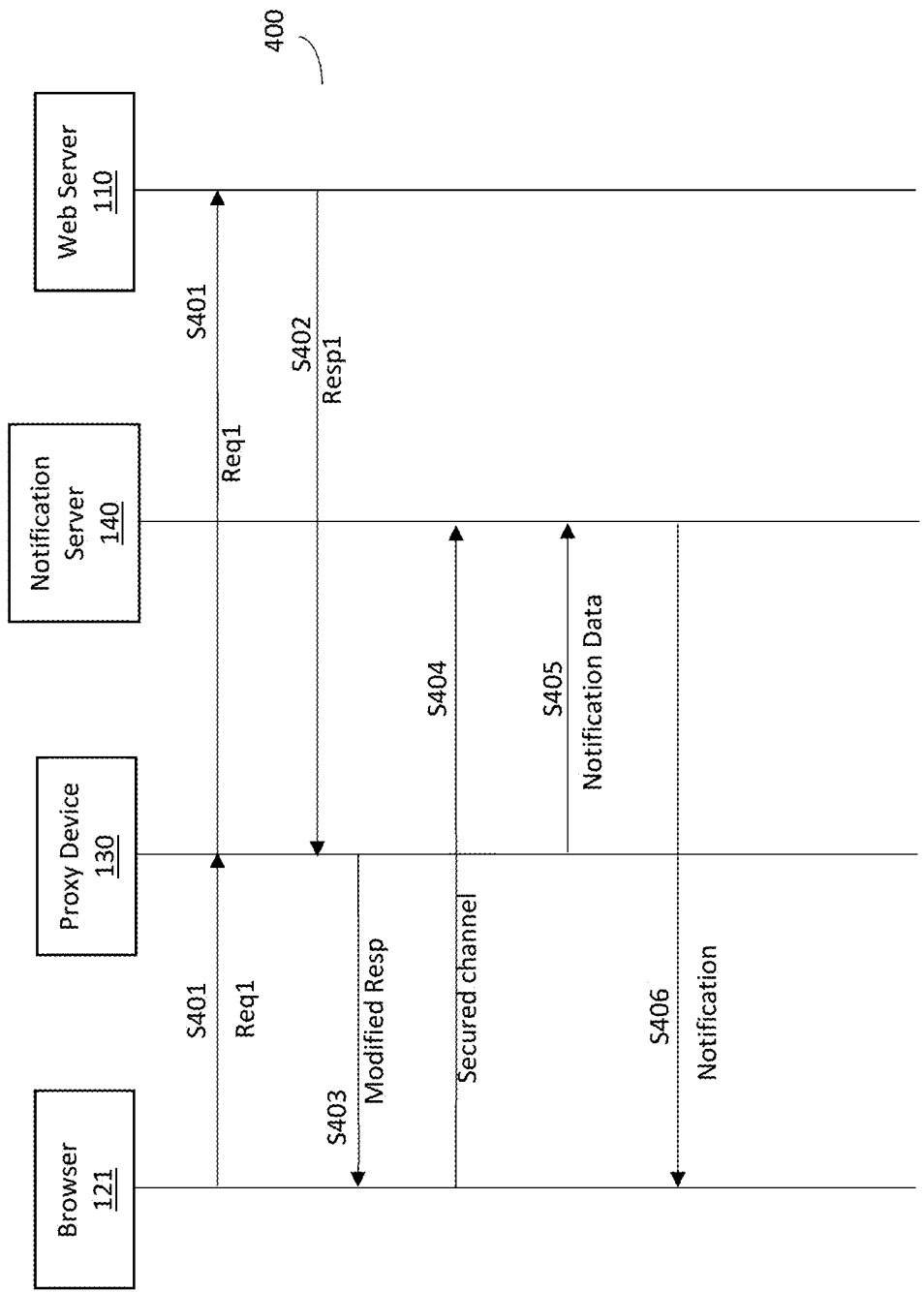
FIG. 4 is a sequence diagram illustrating an on-demand push notification process according to an embodiment.

FIG. 4 shows an example sequence diagram 400 illustrating an on-demand push notification according to an embodiment. The diagram 400 illustrates the web browser 121, the proxy device 130, the notification server 140, and a web server 110. Some embodiments that can be implemented to realize each of these entities and the connectivity between these entities are discussed in detail above. The web server 110 executes a web resource 115.

At S401, a request (Reqi) sent from the web browser 121 to the web server 110 is captured by the proxy device 130. The request (Reqi) may be, for example, a log-in request to access the web resource. The proxy device 130 may further log certain identifiers in the request for future use. The request is then relayed by the proxy device 130 to the web server 110.

At S402, in response to the request (Reqi), the web server 110 sends a response (Respi) to the browser 121, and the response is intercepted by the proxy device 130. The response (Respi) is processed and modified by the proxy device 130. Specifically, the managed proxy device 130 modifies the response to include a messaging handler. As noted above, the messaging handler may be a script embedded in iFrame HTML tags. At S403, the modified response is sent to the web browser 121.

Once the response is processed by the web browser 121, a secured channel is established with the notification server 140 (S404). The communication between the web browser 121 and the notification server 140 over the secured channel can be performed using a WebSocket protocol.

At S405, notification data is sent from the managed proxy device 130 to the notification server 140. The notification data includes at least a message code and an identifier of a client device executing the browser 121. The notification data may be sent when, for example, a message should be reported to a user of the web browser 121. Examples for possible messages are provided above.

At S406, the notification data is used by the server 140 to compile and push a notification to the web browser 121. The compilation of the notification may be based on a predefined template selected using the message code. As a non-limiting example, message code '279' would result in generating a notification on "download restricted" as shown in FIG. 2. As part of the notification's compilation process, the server 140 may designate some specific details (e.g., restricted file name) related to an action taken by the proxy device 130.

The steps S405 and S406 are repeated for each notification to be displayed during an active session between the application 115 and the web browser 121. It should be further noted that a new message handler is provided for new responses provided by the web server 110, when a new web resource is accessed, or both.

Figure 5:
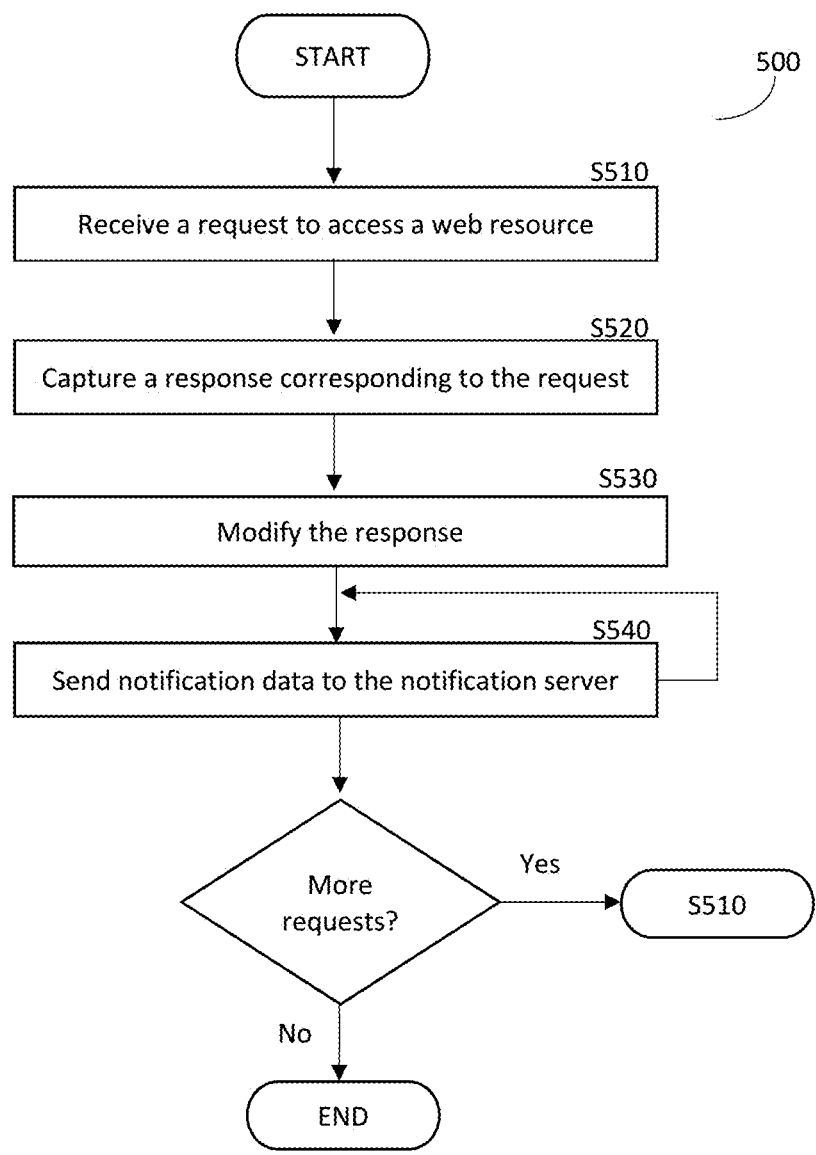
FIG. 5 is a flowchart illustrating a method of operation of a proxy device controlling an on-demand push notification process according to an embodiment.

FIG. 5 depicts an example flowchart 500 illustrating a method for providing on-demand push notifications according to an embodiment. The method may be performed by the managed proxy device 130 discussed herein above with reference to FIG. 1.

At S510, a request to access a web resource is received from a client device. The request may be, for example, a HTTP request or a HTTPS request. In an embodiment, S510 includes the received request to log certain identifiers in the request that would allow for detection of the corresponding response. Examples for such identifiers may be layer-7 protocol identifiers (e.g., a user name) or layer-4 protocol identifiers (e.g., a source or destination IP address). Upon completing the processing of the received request, the request is sent to the destination server (designated in the request).

At S520, a response corresponding to the received request is captured or otherwise received. At S530, the response is modified to include at least a messaging handler and the modified response is sent to the client device. In an embodiment, when the response is a HTML page, an iFrame is embedded in the HTML page. The script encapsulated in the iFrame realizes the messaging handler. The modified response is sent to the client device. The modified response, and in particular the messaging handler when processed by the web browser causes the web browser to establish a secured channel with the notification server.

At S540, notification data is sent to the notification server. The notification data may include at least a message code and a unique identifier of the messaging handler. Examples for the contents of the notification data is provided above.

In an example embodiment, the events that would trigger sending notification data to the notification server, and thereby to push such notifications to the browser are pre-defined in a notification policy maintained by the proxy device. The notification policy may be defined per web resource, per user, or both, and may indicate the type of notifications to push and when to push such notifications.

For example, the user activity with respect to the web resource is monitored and the notification may be sent to the notification server when a mitigation action is performed, the destination server is down, the web resource is not available, or the overall browsing experience is affected.

As noted above, a notification is compiled using the notification data and pushed to the browser over the communication channel. The notification may be formatted as a pop-up message displayed over the user's browser. In some embodiments, the notification may be in a format of a text message, an email, an instant message, and the like.

In an alternative embodiment, when the notification server and the proxy server are implemented in the same device (or by the same process), such device (or process) may compile the notification and push the notification directly to the web browser.

At S550, it is checked if a new request has been received. If so, execution returns to S510; otherwise, execution ends.

It should be noted that embodiments disclosed herein are not limited to being implemented by a proxy device that monitors and regulates access to a web application. Further, the nature of the notifications is not limited to mitigation actions restricting access to the web resource. For example, the embodiments disclosed herein can be implemented to push notifications about promotions, live updates, warnings, and so on.

Figure 6:
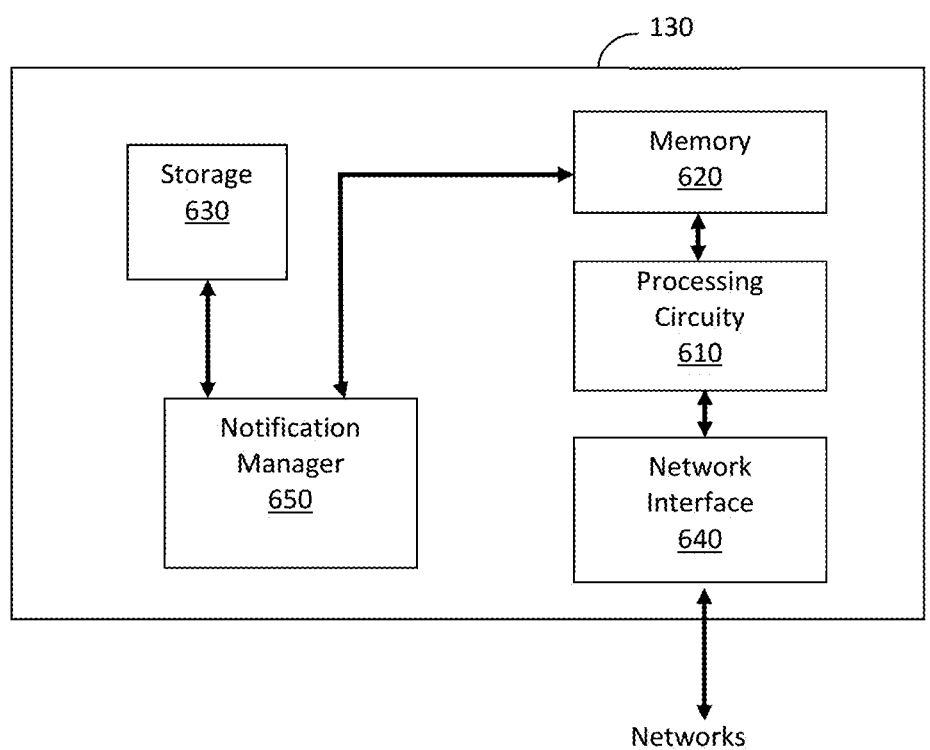
FIG. 6 is a block diagram of a proxy device implemented according to an embodiment.

FIG. 6 shows an example block diagram of a proxy device 130 constructed according to an embodiment. The proxy device 130 may be deployed in cloud computing platforms, data centers, or as a stand-alone network device. The proxy device 130 may be configured to operate as, for example, a forward proxy, a suffix proxy, a managed proxy and the like.

The proxy device 130 is configured to at least perform on-demand push notifications to a client device from a plurality of web resources. The proxy device 130 includes a processing circuitry 610 coupled to a memory 620, a storage 630, a network 640, and a notification manager 650.

The processing circuitry 610 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 620 may be volatile (e.g., RAM, etc.), non-volatile (e.g., ROM, flash memory, etc.), or a combination thereof.

The storage 630 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 630. The storage 630 may also store other computer readable instructions to implement an operating system, an application program, and the like. Computer readable instructions may be loaded in the memory 620 for execution by the processing circuitry 610.

In some configurations, a portion of the storage device 630 may be realized as a cache memory configured to store, for example, certificates of signed domain names. The certificates may be pre-installed or pre-loaded to the storage 630, and may be added in response to requests to generate certificates or to retrieve certificates from the CGS. The storage device 630 may also include public keys, session keys, and the like required to perform an authentication process.

In another embodiment, the storage 630, the memory 620, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various functions described herein. Such functions may include, but not are limited to, controlling the operation of the notification manager 650 and other tasks conventionally performed by the forward or suffix proxy (e.g., rewriting or suffixing URLs).

The network interface 640 allows the proxy device 630 to communicate with other proxy devices, the CGS, and client devices. The communication may be over a network (e.g., the network 250, FIG. 2) using standard cryptographic communication protocols, proprietary APIs, or both.

In an example embodiment, the network interface 640 allows for remote access to the proxy devices 130 for the purpose of, for example, configuration, reporting, and the like. Such a connection, in an embodiment, can be realized through a web portal. The network interface 640 may include a wired connection or a wireless connection. The network interface 640 may transmit communication media, receive communication media, or both. For example, the network interface 640 may include a modem, a network interface card (NIC), an integrated network interface, a radio frequency transmitter/receiver, an infrared port, a USB connection, and the like.

The notification manager 650 is configured to perform the process for pushing notification on-demand. Upon receiving a response from a server, the notification manager 650 is configured to modify the response to include the notification handler. The modified response is sent to the client device. The notification manager 650 is further configured to send to notification data to a notification server (e.g., the notification server 140, FIG. 1), when a notification should be sent to the client device. The operation of the notification manager 650 is further discussed with reference to FIG. 1.

In an embodiment, the notification manager 650 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method, comprising:
   receiving, by a proxy device, a request from a client device to access a first web resource of a plurality of different web resources;
   modifying, by the proxy device, a received response to include at least a messaging handler, wherein the response corresponds to the received request;
   returning, by the proxy device, the modified response with the messaging handler to the client device, wherein the messaging handler causes establishment of a communication channel between the client device and a notification server that is separate from the proxy device, wherein the communication channel between the client device and the notification server is a secured channel; and
   providing, by the proxy device, the notification server with at least one notification, wherein the notification server immediately pushes the at least one notification to the client device over the communication channel on-demand of the proxy device regardless of whether the first web resource is currently accessed by the client device, wherein the at least one notification is related to at least the first web resource of the plurality of different web resources.

2. The method of claim 1, further comprising:
   receiving, by the proxy device, a request to access a second web resource of the plurality of web resources; and
   causing the notification server to push, to the client device, at least one notification related to the second web resource, wherein the first web resource and the second web resource are different.

3. The method of claim 1, wherein the messaging handler includes script code.

4. The method of claim 3, wherein the response is a hypertext transfer protocol (HTTP) response, wherein the script code is embedded in an iFrame tag.

5. The method of claim 1, wherein providing the notification server with at least one notification further comprises:
   providing notification data enabling the notification server to compile the at least one notification.

6. The method of claim 5, wherein the notification data includes at least a unique identifier identifying the messaging handler and at least a message code identifying the at least one notification to be pushed.

7. The method of claim 1, further comprising:
   monitoring and regulating, by the proxy device, access to each of the plurality of web resources.

8. The method of claim 1, wherein each of the web resources is any of: a web application, a cloud application, a single-page application, and a website.

9. A non-transitory computer readable medium having stored thereon instructions for causing a processing circuitry to execute a process for on-demand push notification, the process comprising:
   receiving, by a proxy device, a request from a client device to access a first web resource of a plurality of web resources;
   modifying, by the proxy device, a received response to include at least a messaging handler, wherein the response corresponds to the received request;
   returning, by the proxy device, the modified response with the messaging handler to a client device, wherein the messaging handler causes establishment of a communication channel between the client device and a notification server that is separate from the proxy device, wherein the communication channel between the client device and the notification server is a secured channel; and
   providing, by the proxy device, the notification server with at least one notification, wherein the notification server immediately pushes the at least one notification to the client device over the communication channel on-demand of the proxy device regardless of whether the first web resource is currently accessed by the client device, wherein the at least one notification is related to at least the first web resource of the plurality of different web resources.

10. A proxy device, comprising:
    a processing circuitry; and
    a memory, the memory containing instructions that, when executed by the processing circuitry, configure the proxy device to:
    modify a received response to include at least a messaging handler, wherein the response corresponds to the received request to access a first web resource of a plurality of web resources;
    return the modified response with the messaging handler to a client device, wherein the messaging handler causes establishment of a communication channel between the client device and a notification server that is separate from the proxy device, wherein the communication channel between the client device and the notification server is a secured channel; and
    provide the notification server with at least one notification, wherein the notification server immediately pushes the at least one notification to the client device over the communication channel on-demand of the proxy device regardless of whether the first web resource is currently accessed by the client device, wherein the at least one notification is related to at least the first web resource of the plurality of different web resources.

11. The proxy device of claim 10, wherein the proxy device is further configured to:
    receive a request to access a second web resource of the plurality of web resources; and
    cause the notification server to push, to the client device, at least one notification related to the second web resource, wherein the first web resource and the second web resource are different.

12. The proxy device of claim 11, wherein the proxy device is further configured to:
    monitor and regulate, by the proxy device, access to each of the plurality of web resources.

13. The proxy device of claim 11, wherein each of the web resources is any of: a web application, a cloud application, a single-page application, and a website.

14. The proxy device of claim 11, wherein the proxy device includes any one of: a suffix proxy, a forward proxy, and a managed proxy.

15. The proxy device of claim 10, wherein the messaging handler includes script code.

16. The proxy device of claim 15, wherein the response is a hypertext transfer protocol (HTTP) response, wherein the script code is embedded in an iFrame tag.

17. The proxy device of claim 10, wherein the proxy device is further configured to:
    provide notification data enabling the notification server to compile the at least one notification.

18. The proxy device of claim 17, wherein the notification data includes at least a unique identifier identifying the messaging handler and at least a message code identifying the at least one notification to be pushed.

\* \* \* \* \*